US012697731B2

(12) United States Patent

Butterfoss et al.

(10) Patent No.: US 12,697,731 B2

(45) Date of Patent: Aug. 4, 2026

(54) GENERATING ROBOTIC CONTROL PLANS

(71) Applicant: Intrinsic Innovation LLC, Mountain View, CA (US)

(72) Inventors: Ryan Butterfoss, San Francisco, CA (US); Adam Nicholas Ruxton, Sunnyvale, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 300 days.

(21) Appl. No.: 17/108,761

(22) Filed: Dec. 1, 2020

(65) Prior Publication Data

US 2022/0172107 A1 Jun. 2, 2022

(51) Int. Cl.
B25J 9/16 (2006.01)
G05B 13/02 (2006.01)
(Continued)

(52) U.S. Cl.
CPC ............. B25J 9/1697 (2013.01); B25J 9/163 (2013.01); B25J 9/1687 (2013.01);
(Continued)

(58) Field of Classification Search
CPC ........ B25J 9/1687; B25J 9/1669; B25J 9/161; B25J 9/163; B25J 9/1697; B25J 9/1661;
(Continued)

(56) References Cited

U.S. PATENT DOCUMENTS 11,600,263 B1 * 3/2023 Blair .......................... G06T 1/00
2014/0277679 A1 * 9/2014 Weinberg ............... B25J 9/1658
901/30

(Continued)

FOREIGN PATENT DOCUMENTS

CN 111203878 A 5/2020
JP 1988288683 11/1988
(Continued)

OTHER PUBLICATIONS

Reeve, "Robots that can read instruction manuals invented at University of Southampton", Feb. 15, 2011, Daily Echo, https://www.dailyecho.co.uk/news/8854163.robots-that-can-read-instruction-manuals-invented-at-university-of-southampton/ (Year: 2011).*
(Continued)

*Primary Examiner* — Khoi H Tran
*Assistant Examiner* — Tanner L Cullen
(74) *Attorney, Agent, or Firm* — Fish & Richardson P.C.

(57) ABSTRACT

Methods, systems, and apparatus, including computer programs encoded on computer storage media, for generating a robotic control plan. One of the methods includes obtaining, from a user device, image data depicting an instruction manual for assembling a plurality of assembly components; processing the image data using a machine learning model to generate instruction data representing a sequence of instructions for assembling the plurality of assembly components, wherein the machine learning model has been configured through training to process images depicting instruction manuals and to generate instruction data characterizing sequences of instructions identified in the instruction manuals; processing the instruction data to generate a robotic control plan to be executed by one or more robotic components for assembling the plurality of assembly components; and providing the robotic control plan to a robotic control system for executing the robotic control plan using the one or more robotic components.

24 Claims, 6 Drawing Sheets

(51) Int. Cl.
*G05B 19/4155* (2006.01)
*G05B 19/418* (2006.01)

(52) U.S. Cl.
CPC ...... *G05B 19/4155* (2013.01); *G05B 13/0265*
(2013.01); *G05B 19/41805* (2013.01)

(58) Field of Classification Search
CPC ................ B25J 11/0045; B25J 11/008; G05B
2219/40033; G05B 2219/40114; G05B
19/41805; G05B 2219/40499; G05B
13/0265; G05B 19/4155; G06N 20/00;
G06N 3/02; G06N 3/08; G06N 3/0464;
G06V 10/255; G06V 20/10; G06V 30/10;
G06V 30/40; G06V 30/422; G06V
30/418; G06V 30/14; G06V 10/82; G06K
7/1404; G07B 2017/00725
See application file for complete search history.

(56) References Cited

U.S. PATENT DOCUMENTS

| | | | |
|---|---|---|---|
| 2018/0333853 | A1* | 11/2018 | Cousins ............... G05D 1/0276 |
| 2018/0349743 | A1* | 12/2018 | Iurii ................. G06V 30/19173 |
| 2019/0099890 | A1 | 4/2019 | Harada |
| 2019/0236212 | A1* | 8/2019 | Heindorf ............. G06F 16/7867 |
| 2019/0275671 | A1 | 9/2019 | Natarajan et al. |
| 2019/0308317 | A1* | 10/2019 | Noda ........................ B25J 9/163 |
| 2020/0082218 | A1* | 3/2020 | Hoehne ................ G06V 30/413 |
| 2020/0211413 | A1* | 7/2020 | Zhang .................. A63H 33/042 |
| 2020/0331144 | A1 | 10/2020 | Hunag et al. |
| 2021/0001488 | A1* | 1/2021 | Birkmeyer ............. B25J 9/1679 |
| 2021/0268658 | A1* | 9/2021 | Kalouche ................. B25J 19/04 |
| 2021/0379766 | A1* | 12/2021 | Kawamoto ............ B25J 9/1661 |
| 2022/0093000 | A1* | 3/2022 | Munich ................ G09B 17/003 |
| 2023/0214583 | A1* | 7/2023 | Sawyer ............ G06V 30/19173 |

FOREIGN PATENT DOCUMENTS

| | | | | |
|---|---|---|---|---|
| JP | 1990081102 | 3/1990 | | |
| JP | 1993150835 | 6/1993 | | |
| JP | 2018118343 | 8/2018 | | |
| JP | 6390088 | 9/2018 | | |
| JP | 2020019118 | 2/2020 | | |
| KR | 101936130 | 1/2019 | | |
| WO | WO-2022056050 A1 * | 3/2022 | ............ | B25J 9/1697 |

OTHER PUBLICATIONS

International Search Report and Written Opinion in International Appln. No. PCT/US2021/054748, dated Jan. 28, 2022, 9 pages.
International Preliminary Report on Patentability in International Appln. No. PCT/US2021/054748, dated Jun. 15, 2023, 6 pages.
Office Action in Japanese Appln. No. 2023-533340, dated May 30, 2024, 14 pages (with English translation).
Takata et al., "Task Planning for Cooking Robot Based of Recipe of the cooking plan based on a robot based on recipes," Proceedings of the JSME Conference on Robotics and Mechatronics, May 27-29, 2020(5):M16(2)-M16(4) (with English abstract).
Extended Search Report in European Appln. No. 21901230.9, Sep. 24, 2024, 12 pages.
Knepper et al., "IkeaBot: An autonomous multi-robot coordinated furniture assembly system," 2013 IEEE International Conference on Robotics and Automation, May 6, 2013, pp. 855-862.
Park et al., "Recognition of Assembly Instructions Based on Geometric Feature and Text Recognition," 2020 17th International Conference on Ubiquitous Robots, Jun. 22-26, 2020, pp. 139-143.
Saurez-Ruiz et al., "Can robots assemble an IKEA chair?," Science Robotics, Apr. 18, 2018, 3(7): 8 pages.
Seung-Hyeok, "Research trends in understanding assembly instructions and generating work plans for robot assembly," KICS—The Journal of the Korean Institute of Communication Science, Dec. 1, 2019, 27(1):40-45 (with machine translation).
Office Action in Chinese Appln. No. 202180092435.1, mailed on May 27, 2025, 15 pages (with English translation).
Office Action in Korean Appln. No. 10-2023-7022121, mailed on Jun. 23, 2025, 15 pages (with English translation).

* cited by examiner

GENERATING ROBOTIC CONTROL PLANS

BACKGROUND

This specification relates to robotics, and more particularly to planning robotic movements.

Robotics planning refers to sequencing the physical movements of robotic components in order to perform tasks. For example, an industrial robot that builds cars can be programmed to first pick up a car part and then weld a car part onto the frame of the car. Each of these actions can themselves include dozens or hundreds of individual movements by robot motors and actuators.

Robotics planning has traditionally required immense amounts of manual programming in order to meticulously dictate how the robotic components should move in order to accomplish a particular task. Manual programming is tedious, time-consuming, and error prone. In addition, a plan that is manually generated for one robotic operating environment can generally not be used for other robotic operating environments. In this specification, a robotic operating environment is the physical environment in which a robotic component will operate. Robotic operating environments have particular physical properties, e.g., physical dimensions, that impose constraints on how robotic components can move within the robotic operating environment. Thus, a manually-programmed plan for one robotic operating environment may be incompatible with a robotic operating environment having different physical dimensions.

Robotic operating environments often contain more than one robot. For example, a robotic operating environment can have multiple robotic components each welding a different car part onto the frame of a car at the same time. In these cases, the planning process can include assigning tasks to specific robotic components and planning all the movements of each of the robotic components. Manually programming these movements in a way that avoids collisions between the robotic components while minimizing the time to complete the tasks is difficult, as the search space in a 6D coordinate system is very large and cannot be searched exhaustively in a reasonable amount of time.

SUMMARY

This specification generally describes how a system can obtain instruction data characterizing instructions for a task to assemble multiple assembly components, e.g., assembly instructions for a piece of furniture. The system can then generate, according to the instruction data, a robotic control plan for one or more robotic components to accomplish the assembly task within a robotic operating environment. In some implementations, the system can generate the instruction data using data representing an instruction manual for the assembly task, e.g., using images of the instruction manual. In some other implementations, the system can identify instruction data provided by an external system, e.g., provided by a manufacturer of the assembly components.

Particular embodiments of the subject matter described in this specification can be implemented so as to realize one or more of the following advantages.

Using techniques described in this specification, a system can automatically generate a robotic control plan to accomplish a new assembly task for which the system has never generated a robotic control plan before. For example, the system can automatically generate a robotic control plan to assemble a piece of furniture that the robotic components have never assembled before. In some implementations, a user can provide images depicting an instruction manual for the piece of furniture as input to a machine learning model that has been trained using instruction manuals for assembling other pieces of furniture. The machine learning model can automatically parse the new instruction manual to generate instruction data that the system can use to generate the robotic control plan. Therefore, a user can simply capture images of the instruction manual for any new piece of furniture, and the system can provide a robotic control plan for assembling the new piece of furniture.

Using techniques described in this specification, a system can generate a robotic control plan specific to a "temporary" robotic operating environment, i.e., an environment in which the robotic components will complete only one or a few tasks and/or in which the robotic components will be dismantled or removed after a short time, e.g., a day or a week. For example, the robotic operating environment can be in a user's home, e.g., in a garage, and the robotic components can be delivered to the user's home to accomplish a particular task, e.g., assembling furniture. Thus, the techniques described in this specification can enable the robust and reliable assembly of complex items in a fully-automated way and in robotic operating environments that are temporary.

As a particular example, a user might purchase an unassembled piece of furniture, e.g., a desk, from a store. When the store sends the packed assembly components of the desk to the home of the user, the store can also send one or more robotic components.

Using techniques described in this specification, the user can set up the robotic components within the home to create a temporary robotic operating environment for assembling the desk, e.g., in the garage of the home of the user. After the user sets up the robotic operating environment, a robotic planning system can automatically generate a robotic control plan for assembling the desk. The robotic planning system can provide the robotic control plan to a robotic control system, which can instruct the robotic components to assemble the desk. After the assembly is completed, the user can send robotic components back to the store. In this way, the store can enable customers to automatically assemble purchased furniture in new environments in a time-efficient and cost-efficient manner. The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
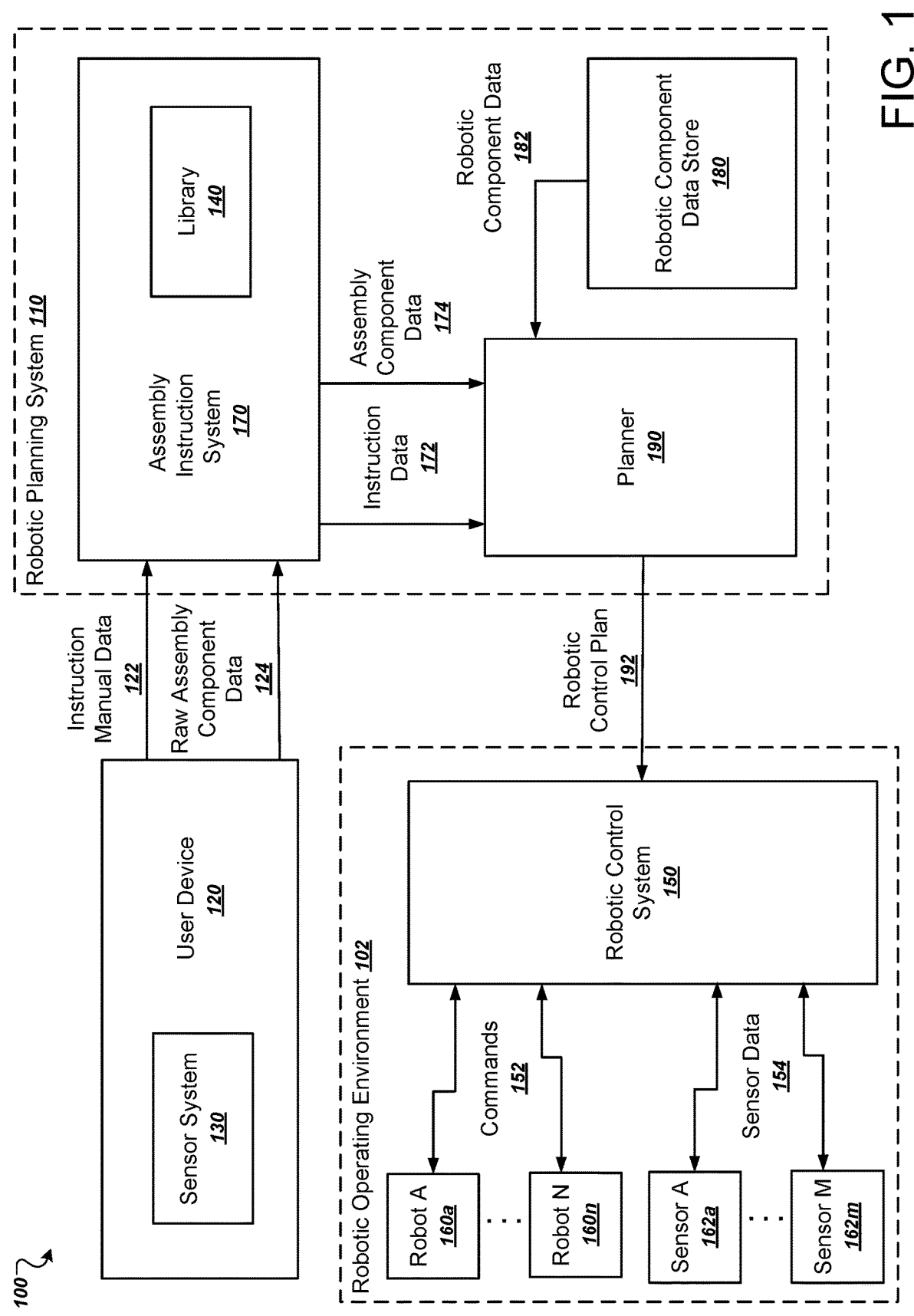
FIG. 1 is a diagram of an example system.

FIG. 1 is a diagram that illustrates an example system 100. The system 100 is an example of a system that can implement the techniques described in this specification.

The system 100 includes a robotic operating environment 102 and a robotic planning system 110. The robotic operating environment 102 includes a robotic control system 150. The robotic planning system includes an assembly instruction system 170, a robotic component data store 180, and a planner 190. Each of these components can be implemented as computer programs installed on one or more computers in one or more locations that are coupled to each other through any appropriate communications network, e.g., an intranet or the Internet, or combination of networks.

The robotic operating environment 102 includes N robotic components 160*a-n*, N≥1. The robotic control system 150 is configured to control the robotic components 160*a-n*. The overall goal of the planner 190 of the robotic planning system 110 is to generate a robotic control plan 192 that allows the robotic control system 150 to execute one or more tasks in the robotic operating environment 102. The tasks in the robotic control plan 192 can include an assembly task, whereby the robotic components 160*a-n* manipulate one or more assembly components in order to assemble a final assembly product. In particular, the robotic control system 150 can execute the robotic control plan 192 by issuing commands 152 to the robotic components 160*a-n* in order to drive the movements of the robotic components 160*a-n*.

The robotic operating environment 102 can also include M sensor components 162*a-m*, M≥1. The sensor components 162*a-m* can be any type of sensors that can take measurements of a current state of the robotic operating environment 102, e.g., one or more cameras, one or more lidar sensors, one or more ultrasonic sensors, and/or one or more microphones. In implementations in which there are multiple sensor components 162*a-m*, different sensor components 162*a-m* can be of a different type, in a different position in the robotic operating environment 102, and/or differently configured than the other sensor components 162*a-m* in the robotic operating environment 102.

The sensor components 162*a-m* can capture sensor data 154 before and/or during the execution of the robotic control plan 192, where the sensor data 154 characterizes the robotic operating environment 102. The sensor components 162*a-m* can send the sensor data 154 to the robotic control system 150. The robotic control system 150 can use the sensor data 154 to execute the robotic control plan 192. For example, the robotic control system 150 can use the sensor data 154 captured by the sensor components 162*a-m* to generate the commands 152 issued to the robotic components 160*a-n*, e.g., by generating commands that ensure that the robotic components 160*a-n* avoid a particular obstacle identified in the sensor data 154.

In some implementations, the robotic control system 150 can also issue commands 152 to the sensor components 162*a-m*. For example, the robotic control system 150 can issue commands 152 that identify particular times at which one or more sensor components 162*a-m* should capture particular desired observations of the robotic operating environment 102. In some implementations, the sensor components 162*a-m* can be moved within the robotic operating environment 102. For example, a sensor component 162*a-m* can be attached to a robotic arm that can move the sensor component 162*a-m* to different positions in the robotic operating environment 102 in order to capture desired observations. In these implementations, the robotic control system 150 can issue commands 152 that specify an orientation and/or position of the sensor component 162*a-m* for each desired observation.

The robotic control system 150 can be configured, e.g., configured through training of one or more machine learning models of the robotic control system 150, to execute robotic control plans 192 in many different types of robotic operating environments 102. For example, the robotic control system 150 can be configured to operate the robotic components 160*a-n* in many different lighting situations. As a particular example, the robotic control system 150 can operate the robotic components 160*a-n* in dimly-lit operating environments using the sensor data 154 captured by the sensor components 162*a-m*, e.g., in temporary robotic operating environments 102 such as garages or attics that are not fitted with industrial-quality lighting equipment.

In particular, the planner 190 is configured to generate the robotic control plan 192 using i) instruction data 172 and ii) assembly component data 174, both provided by the assembly instruction system 170.

The instruction data 172 is data representing a sequence of subtasks of the assembly task that is to be completed by the robotic components 160*a-n*. In some implementations, one or more subtasks of the sequence of subtasks can be completed in parallel. The data representing each subtask can identify the assembly components that are involved in the subtask and one or more operations that must be performed by the robotic components 160*a-n* in order to accomplish the subtask (e.g., torque insertion operations, perpendicular insertion operations, rotation operations, etc.). Optionally, the data representing each subtask can identify one or more of the robotic components 160*a-n* that should perform the one or more actions in the robotic control plan 192.

The assembly component data 174 characterizes the one or more assembly components that are required to assemble the final assembly product of the assembly task of the robotic control plan 192. For example, the assembly component data 174 can define the dimensions of each assembly component, e.g., with a CAD or STL file. The assembly component data 174 can also include other features of each assembly component, e.g., a tensile strength of the materials of the assembly components.

In some implementations, the assembly instruction system 170 obtains the instruction data 172 and/or the assembly component data 174 from an external system. For example, the assembly instruction system 170 can obtain the instruction data 172 and/or the assembly component data 174 from an external system of a manufacturer of the assembly components. That is, the manufacturer of the assembly components (e.g., assembly components of ready-to-assemble furniture) can provide all the information required to complete the assembly task, e.g., instructions for assembling the assembly components, material specifications of the assembly components, robotic component specifications identifying required robotic components for assembly, etc.

In some such implementations, the assembly instruction system 170 is configured to receive an identification of the assembly task from a user device 120 of the system 100, e.g., by receiving an identification of the ready-to-assembly product sold to the user. For example, the user device 120 might obtain a user input identifying the assembly task, e.g., by a voice command or a text input. As another example, the manufacturer can include a visual marker, e.g., a bar code or a QR code, on the packaging of the ready-to-assemble product sold to the user, which the user can scan and provide to the assembly instruction system 170. The assembly instruction system 170 can then obtain the instruction data 172 and/or the assembly component data 174 according to the user input, e.g., from a database provided by the manufacturer.

In some other implementations, e.g., when information about the assembly task is not available from the manufacturer, the assembly instruction system can generate the instruction data 172 and/or the assembly component data 174 using data provided by the user device 120. The user device 120 can be any appropriate device, e.g., a mobile phone, tablet, laptop, or desktop.

The user device 120 can be configured to provide instruction manual data 122 and raw assembly component data 124 to the assembly instruction system 170. The instruction manual data 122 characterizes an instruction manual for completing the assembly task, e.g., an instruction manual provided to the user by the manufacturer of the ready-to-assemble product. The raw assembly component data 124 characterizes the assembly components of the assembly task.

The user device 120 can include a sensor system 130 for capturing the instruction manual data 122 and the raw assembly component data 124. The sensor system 130 can include one or more sensors configured to capture sensor data of the instruction manual and/or the assembly components. The sensors in the sensor system 130 can be any appropriate type of sensor, e.g., a camera, a lidar sensor, an ultrasonic sensor, or a microphone. In some implementations, there can be multiple sensors in the sensor system 130, where different sensors are of a different type and/or differently configured than the other sensors in the sensor system 130.

For example, the sensor system 130 can include a camera that the user can use to capture images of the instruction manual. As a particular example, the user device 120 can have an application installed that prompts the user to capture an image of each page in the instruction manual. Example user interfaces for such an application are described below with respect to FIGS. 2A, 2B, 2C, and 2D. The images of the instruction manual can then be included in the instruction manual data 122 and provided to the assembly instruction system 170.

The user can also use the camera of the sensor system 130 to capture one or more images of each assembly component. The images can be included in the raw assembly component data 124. The user can also identify, for each assembly component, a number of identical copies of the assembly component that are available; for example, the user might identify that there are multiple copies of the same type of screw available for the assembly task.

As another example, the sensor system 130 can capture measurements of each assembly component and generate geometry data that characterizes the geometry of the assembly component, e.g., by generating a stereolithography (STL) file for each assembly component. As a particular example, the sensor system 130 can capture lidar data of each assembly component and use the lidar data to generate the geometry data. The geometry data can be included in the raw assembly component data 124.

After receiving the instruction manual data 122 and the raw assembly component data 124, the assembly instruction system 170 can process the instruction manual data 122 to generate the instruction data 172, and process the raw assembly component data 124 to generate the assembly component data 174.

For example, if the instruction manual data 122 includes images of the instruction manual, then the assembly instruction system 170 can process each image using a machine learning model to generate the instruction data 172, e.g., using a convolutional neural network.

In some implementations, the assembly instruction system 170 can use multiple different machine learning models to process images corresponding to different types of pages of the instruction manual.

For example, the instruction manual can have one or more "component identification" pages, usually in the beginning of the manual, that list the assembly components required to complete the assembly task, e.g., that list each assembly component provided in the ready-to-assemble product. Often, component identification pages include illustrations and/or text descriptions of the assembly components. A "component identification" machine learning model can process images of component identification pages to identify the assembly components of the assembly task.

As another example, the instruction manual can have one or more "subtask" pages that each identify one or more subtasks of the assembly task. That is, for each subtask, a respective subtask page of the instruction manual identifies i) the assembly components required to complete the subtask and ii) the actions that must be performed to complete the subtask. Often, subtask pages include illustrations and/or text descriptions of the actions required to complete the subtask. A "subtask" machine learning model can process images of subtask pages to generate, for each page, instruction data 172 corresponding to the one or more subtasks of the assembly task identified on the page. As a particular example, if each subtask page of the instruction manual illustrates one subtask of the assembly task, then the subtask machine learning model can process an image of each subtask page to generate instruction data 172 characterizing the respective subtasks.

In some such implementations, the instruction manual data 122 provided to the assembly instruction system 170 by the user device 120 identifies, for each image, the type of page depicted by the image. For example, each image of the instruction manual data 122 can be assigned one class of multiple classes corresponding to types of pages of instruction manuals. As a particular example, the user device 120 can prompt the user to provide, for each image, a user input identifying the class; e.g., the user device 120 can display, for each image, a list of the multiple classes so that the user can select one of the classes to which the image should be assigned.

In some other such implementations, the instruction manual data 122 does not identify classes for each image. For example, the assembly instruction system 170 can process each image using a classification machine learning model to generate a predicted class of the image, and then provide the image to a respective other machine learning model according to the predicted class of the image.

The assembly instruction system 170 can process images of the component identification pages of the instruction manual using the component identification machine learning model to determine, for each assembly component, a representation of the assembly component. For example, the representation can be a feature vector, a matrix, or a tensor having representative values for the component. In some implementations, the representation is an embedding. In this specification, an embedding is an ordered collection of numeric values that represents an input in a particular embedding space; e.g., an embedding can be a vector of floating point or other numeric values that has a fixed dimensionality. For example, the embedding of each assembly component can be machine-learned. That is, each embedding can represent the respective assembly component in a machine-learned embedding space that has been determined through training of the component identification machine learning model. In some such implementations, the assembly instruction system 170 can determine a different embedding for each unique assembly component; that is, for each assembly component for which there are multiple copies available (e.g., multiple screws of the same type), the assembly instruction system 170 can determine a single embedding.

For example, the component identification machine learning model can include a first machine learning model that processes each component identification page to detect one or more assembly components depicted on the component identification page. That is, because each component identification page can include depictions of multiple different assembly components, the first machine learning model can detect and isolate the respective depiction for each assembly component depicted on the component identification page. For example, the first machine learning model can receive as input an image of a component identification page, and the output of the first machine learning model can be data defining the location within the input image of one or more depictions of respective assembly components. As a particular example, the data can define one or more bounding boxes, where each bounding box encloses a region of the input image that depicts a respective assembly component. For each detected assembly component, the assembly instruction system 170 can then extract the portion of the input image that depicts the assembly component (e.g., by extracting the pixels within the defined bounding box), and process the portion of the input image with a second machine learning model to determine the representation of the assembly component.

In some implementations, the assembly instruction system 170 can obtain predetermined representations for one or more of the assembly components, e.g., from a library 140 of the assembly instruction system 170. For example, the library 140 can include representations for common assembly components that are used in multiple assembly tasks, e.g., certain sizes and types of screws or panels. For convenience, assembly components that have predetermined representations stored in the library 140 are called "predetermined assembly components."

As a particular example, for each predetermined assembly component, the library 140 can include a text description of the predetermined assembly component. The assembly instruction system 170 can then determine whether the same text description or a similar text description occurs on the component identification pages. If so, the assembly instruction system 170 can determine that the assembly component associated with the text description on the component identification page is the same as the predetermined assembly component.

As another particular example, the assembly instruction system 170 can process a depiction of each particular assembly component as depicted on a component identification page (e.g., by processing the portion of an image of the component identification as identified by the first machine learning model described above) using a classification machine learning model to generate a prediction of whether the particular assembly component matches a predetermined assembly component. For example, for each predetermined assembly component, the classification machine learning model can generate a confidence value that represents a predicted confidence that the particular assembly component matches the predetermined assembly component. If the confidence value corresponding to a respective predetermined assembly component exceeds a threshold, e.g., 0.9 or 0.95, then the assembly instruction system 170 can determine that the particular assembly component is the same as the predetermined assembly component.

As another particular example, the instruction manual data 122 or the raw assembly component data 124 can include an identification of the one or more predetermined assembly components that are assembly components of the current assembly task. For example, the instruction manual data 122 or the raw assembly component data 124 can include an image or identification of a visual marker, e.g., a bar code or a QR code, that corresponds to a predetermined assembly component stored in the library 140. The visual marker can be printed within the instruction manual, on the packaging of the ready-to-assemble product sold to the user, or directly on the physical assembly component; the user can then capture an image or scan of the visual marker and provide the image or scan to the assembly instruction system 170.

For assembly components that do not have a predetermined representation, e.g., for assembly components that are unique to the current assembly task, the component identification machine learning model can generate respective representations.

To generate a representation of an assembly component, the component identification machine learning model can process one or more illustrations of the assembly component using an image processing model, e.g., a convolutional neural network. For example, the component identification machine learning model can process the images of the component identification pages using a first subnetwork to identify illustrations of respective assembly components, e.g., by generating a respective bounding box around each illustration. The component identification machine learning model can then process, for each assembly component, the respective illustration of the assembly component (e.g., by extracting the pixels within the respective bounding box) using a second subnetwork to generate the representation for the assembly component. Instead or in addition, the component identification machine learning model can process text descriptions of each assembly component using a text processing model, e.g., a recurrent neural network.

After determining the representations for each assembly component, the assembly instruction system can process i) the representations of the assembly components and ii) the images of the subtask pages using the subtask machine learning model to generate the instruction data 172.

Subtask pages often include a list of the assembly components required for the respective subtask, e.g., a portion of the subtask page can illustrate assembly components required for the subtask. The subtask machine learning model can process the images of the subtask pages using a first subnetwork to identify the assembly components required for the subtask.

For example, the first subnetwork can identify illustrations of the required assembly components (e.g., by generating bounding boxes around the illustrations), and the subtask machine learning model can compare the identified illustrations against the representations for all of the assembly components. The subtask machine learning model can then determine, for each illustration, an assembly component whose representation is most similar. As a particular example, for each illustration and each representation of a respective assembly component, the subtask machine learning model can process i) the representation and ii) the illustration to generate a similarity score, e.g., using an autoencoder neural network. The subtask machine learning model can then determine, for each illustration, the assembly component with the highest corresponding similarity score.

As another example, the first subnetwork can identify a text description for each required assembly component, and the subtask machine learning model can compare the identified text descriptions against the representations for all the assembly components. The subtask machine learning model can then determine, for each text description, an assembly component whose representations is most similar to the text description. As a particular example, for each text description and each representation of a respective assembly component, the subtask machine learning model can process i) the representation and ii) the text description to generate a similarity score. The subtask machine learning model can then determine, for each text description, the assembly component with the highest corresponding similarity score.

After determining, for each subtask, the required assembly components for the subtask, the subtask machine learning model can process images of the corresponding subtask page of the instruction manual to determine the one or more actions of the subtask, e.g., the one or more manipulations of the required assembly components. Subtask pages can include i) a text description of the one or more actions of the subtask, ii) an illustration of the one or more actions of the subtask, or iii) both. The subtask machine learning model can therefore process i) the text description of the one or more actions, ii) the illustration of the one or more actions, or iii) both to generate the instruction data 172 corresponding to the subtask.

For example, the subtask machine learning model can process a text description of the one or more actions of a subtask using a recurrent neural network, e.g., a long short-term memory (LSTM) neural network, to generate instruction data 172 for the subtask. As a particular example, the text description might read "Insert part A into slot 2 in part B," and the recurrent neural network can generate a network output representing the subtask in the language of the instruction data 172, e.g., "action: insert; part: A; target: B slot 2."

As another example, the subtask machine learning model can process an illustration of the one or more actions of a subtask using a convolutional neural network to generate instruction data for the subtask.

In some implementations, for one or more subtasks, the component identification machine learning model can generate a representation of an updated assembly component that was assembled during the subtask. That is, the subtask included instructions to assembly two or more assembly components into a single updated assembly component. The component identification machine learning model can then generate a representation for the updated assembly component, as described above. The representation of the updated assembly component can then be used to identify the updated assembly component on subsequent subtask pages.

In some implementations, one or more machine learning models of the assembly instruction system 170 can be trained using instruction manuals for other assembly tasks. That is, a training system can obtain multiple training examples that each include i) instruction manual data corresponding to a respective instruction manual and ii) ground-truth model outputs that should be generated from the instruction manual data. The training system can then process the training examples using the one or more machine learning models to determine an update to the parameters of the machine learning models, e.g., using backpropagation.

For example, for each depiction of an assembly component on a component identification page of a training example, the ground-truth model output can include data representing i) the location and/or dimensions of the depiction (e.g., a bounding box circumscribing the description) and ii) a label that identifies the depicted assembly component of the current assembly task. In some implementations, the ground-truth instruction data can also include data identifying a corresponding predetermined assembly component stored in the library 140, as described above.

As another example, the ground-truth model outputs can include ground-truth instruction data characterizing the instruction data 172 that should be generated in response to the instruction manual data of a training example. The ground-truth instruction manual data can have the same format of the instruction data 172, e.g., can be represented by the same language as described in more detail below. The training system can then use the ground-truth instruction data to train the subtask machine learning model to process an image of a subtask page of the instruction manual to extract visual cues from the subtask page characterizing instructions for completing the subtask. The visual cues can include, e.g., arrows pointing to features, depictions of insertion motions, etc.

In some implementations, one or more machine learning models of the assembly instruction system 170 can be trained using to simulation data that represents the simulation of a robotic control plan generated according to training instruction data 172 generated by the system 170 at training time. That is, a training system can process training examples that include instruction manual data and/or training raw assembly component data using the one or more machine learning models to generate training instruction data 172. A simulation system can then simulation the execution of a robotic control plan 192 generated according to the instruction data 172 (e.g., a robotic control plan 192 generated by the planner 190 in response to processing the training instruction data 172) and generate simulation data representing the simulated execution. For example, the simulated data can include data representing the outcome of the robotic control plan, and/or one or more intermediate states of the execution of the robotic control plan. The training system can then determine an update to the parameters of the machine learning models using the simulation data. For example, the training system can use the simulation data to train the one or more machine learning models using reinforcement learning. As a particular example, the training system can use the simulation data to determine a measure of the feasibility of executing a robotic control plan corresponding to the training instruction data 172. The training system can then use the measure of feasibility as a reward signal during reinforcement learning. As another particular example, the training system can use the simulation data to determine a measure of the correctness of the final assembled product that would be assembled according to the robotic control plan corresponding to the training instruction data 172. The training system can then use the measure of correctness as a reward signal during reinforcement learning.

In some implementations, the training system can train different machine learning models corresponding to respective manufacturers of assembly components. Different manufacturers can have different formats and practices for their instruction manuals; e.g., a particular manufacturer can use a common visual language in every instruction manual that is unique to that particular manufacturer. Therefore, for each of multiple manufacturers, the training system can train respective machine learning models to identify the common visual language of the manufacturer in the instruction manuals of the manufacturer, using training examples corresponding to the manufacturer.

The assembly instruction system 170 can process the raw assembly component data 124 to generate the assembly component data 174. The assembly component data 174 includes respective data representing each assembly component of the assembly task. As described above, a subtask of the assembly task can include assembling two or more assembly components to generate an "updated assembly component" that is the combined product of the two or more assembly components. In some implementations, the assembly component data 174 can include respective data representing each updated assembly component that is generated during respective subtasks of the assembly task. In some implementations, the assembly component data 174 includes data representing the final assembled product of the assembly task, i.e., the final updated assembly component that includes each original assembly component of the assembly task.

The assembly component data 174 includes, for each assembly component, i) data defining the dimensions of each assembly component, e.g., with a CAD or STL file, and/or ii) one or more features of each assembly component, e.g., a tensile strength of the materials of the assembly components.

In some implementations, if the raw assembly component data 124 includes images of the assembly components, then the assembly instruction system 170 can process the images to generate respective three-dimensional model of each assembly component, e.g., represented by CAD or STL files. In some implementations in which the assembly component data 174 includes data representing an updated assembly component, the assembly instruction system 170 can generate a three-dimensional model of the updated assembly component. For example, the assembly instruction system 170 can combine the respective three-dimensional models of the assembly components that are assembled to generate the updated assembly component.

In some implementations in which the raw assembly component data 124 includes images of the assembly components, the raw assembly component data 124 provided to the assembly instruction system 170 by the user device 120 identifies, for each image, the assembly component depicted in the image. For example, for each image of the raw assembly component data 124, the user of the user device 120 can provide a user input identifying the depicted assembly component. As a particular example, the user device 120 can prompt the user to provide, for each image, a text input of the name of the assembly component. As another particular example, after the assembly instruction system 170 processes the instruction manual data 122 to identify each required assembly component, the assembly instruction system 170 can provide a list of all required assembly components to the user device 120. The user device 120 can then prompt the user to provide, for each image, an identification of the corresponding assembly component; e.g., the user device 120 can display, for each image, a list of the assembly components so that the user can select the depicted assembly component from the list.

In some other implementations, the raw assembly component data 124 does not include an identification of the assembly component depicted in each image. For example, the assembly instruction system 170 can process each image using a classification machine learning model to generate a predicted identification of the corresponding assembly component. As a particular example, for each image, the classification machine learning model can process i) the image and ii) the respective representation of each assembly component determined using the instruction manual data 122 to generate a respective similarity score between the image and each representation, e.g., using an autoencoder neural network. The classification machine learning model can then determine, for each image, the representation that has the highest similarity score, and determine that the image depicts the assembly component corresponding to the representation.

After determining the assembly component depicted in each image, the assembly instruction system can determine the assembly component data 174 corresponding to each assembly component. The assembly component data 174 is interpretable by the planner 190, and includes characteristics of each assembly component that will help the planner 190 generate a robotic control plan 192 for manipulating the assembly components.

In some implementations, the assembly instruction system 170 can obtain predetermined assembly component data 174 for one or more assembly components, e.g., from the library 140 of the assembly instruction system 170. For example, the library 140 can include assembly component data 174 for common assembly components that are used in multiple assembly tasks.

For assembly components that do not have predetermined assembly component data 174, e.g., for assembly components that are unique to the current assembly task, the assembly instruction system 170 can process the one or more images depicting the assembly component using an assembly component machine learning model to generate the assembly component data 174 corresponding to the assembly component.

For example, the assembly component machine learning model can include a convolutional neural network that is configured to process one or more images of a respective assembly component to generate a network output that characterizes the assembly component data 174 corresponding to the assembly component.

The assembly component data 174 for a particular assembly component can include one or more of the following features: a material of the assembly component; material malleability specifications (e.g., a degree to which the assembly component can bend); a maximum amount of force that can be applied to the assembly component; a texture of the assembly component; a weight of the assembly component; a density of the assembly component; a center of mass of the assembly component; or one or more preferred or required touch points for robotic manipulation (i.e., identifications of respective points on the assembly component at which the assembly component can be touched, grasped, picked up, etc., by a robotic component). As described above, the assembly component data 174 can also include features, e.g., one or more of the above listed features, of an updated assembly component that is an intermediate product of the assembly task.

In some implementations, one or more machine learning models of the assembly instruction system 170 can be trained using raw assembly component data 124 corresponding to other assembly tasks. That is, a training system can obtain multiple training examples that each include i) raw assembly component data corresponding to a respective assembly task and ii) ground-truth assembly component data 174 that should be generated from the raw assembly component data. For example, the ground-truth assembly component data 174 corresponding to each assembly component of each training example can include the actual value for each feature of the assembly component, e.g., each of one or more features described above. The training system can then process the training examples using the one or more machine learning models to determine an update to the parameters of the machine learning models, e.g., using backpropagation.

The instruction data 172 is interpretable by the planner 190. In some implementations, the instruction data 172 is represented in a computer language that is common across all assembly tasks of the robotic planning system 110. That is, the instruction data 172 corresponding to any assembly task can be represented using the same computer language, regardless of, e.g., the manufacturer of the assembly components of the assembly task.

As a particular example, the instruction data 172 can include the following:

Stage 1

Part(s): 4 parts

Part type: wooden panel type C

Visual marker: small hole

Piece(s): 16 pieces

Piece type: wooden stud type 2

Number of subtasks: 16

Movement: stud 2 into panel C

Skill type: Lateral insertion

Force threshold: 0.5 lbs.

Order of operations: unimportant

Success 1: 4 identical objects

Success 2: uniform insertion of studs <1 m from base of panel C

In this example, the assembly task includes multiple stages, where each stage includes one or more subtasks; the instruction data 172 for the first stage is provided. Furthermore, in this example, the robotic planning system 110 represents each assembly component as one of two types: "parts," which are larger components that are to be composed into the final assembly product (e.g., shelves, legs of a table, wooden panels, etc.), and "pieces," which are smaller components that are to be used to compose the parts together (e.g., nails, screws, studs, etc.).

In this example, the first stage of this exemplary assembly task includes 16 subtasks, where each subtask is to place a "wooden stud type 2" into a respective "wooden panel type C." In particular, the robotic components 160$a$-$n$ are to insert the wooden studs into visually distinctive holes in the wooden panels. The instruction data 172 can identify a "skill type" for the subtask, which represents an action that the respective robotic component 160$a$-$n$ that will complete the subtask in the robotic control plan 192 must be able to perform; in this example, the robotic component must be able to perform a lateral insertion. The instruction data 172 can identify a "force threshold," which is an upper bound on the amount of force that can be applied to the assembly components of the subtask; in this example, the assembly components can withstand up to 0.5 lbs. of force. The instruction data 172 can identify a required or preferred order of operations of the subtasks of the assembly task; in this example, the subtasks can be completed in any order. The instruction data 172 can identify one or more standards by which the subtasks can be determined to have been successful. In this example, a first measure of success is whether the wooden panels and studs have been assembled into four identical objects, and a second measure of success is whether the studs have been inserted uniformly in a particular portion of the wooden panels.

After receiving the instruction data 172, the planner 190 can translate the instruction data 172 into the robotic control plan 192 that can be executed by the robotic control system 150.

In some implementations, the planner 190 can generate the robotic control plan 192 by executing one or more optimization simulations that identify the most efficient sequence of robotic movements that successfully accomplish the assembly task. For example, the planner 190 can execute thousands, millions, or billions of such simulations to fine-tune the robotic control plan 192.

In some implementations, the planner 190 can process the instruction data 172 and/or the assembly component data 174 using a "planner" machine learning model in order to generate the robotic control plan 192.

The planner machine learning model can be configured through training using training examples that each include respective instruction data and/or assembly component data corresponding to other assembly tasks. By training on a large corpus of training data, the planner machine learning model can learn how different types of assembly components typically fit together to execute different types of assembly tasks.

In some implementations, a training system can train the planner machine learning model by generating training robotic control plans using the training examples, and simulating the execution of the training robotic control plans using a simulation system to determine a measure of quality of the training robotic control plans. For example, for each of one or more subtasks completed during a training robotic control plan, the simulation system can simulate the manipulation of the assembly components of the subtask in a simulated robotic operating environment according to the training robotic control plan. The training system can then determine, from an outcome of the simulation, the success of the subtask, e.g., according to whether the assembly components of the subtask were successfully assembled to generate an updated assembly component.

As a particular example, the simulation system can simulate the manipulation of the assembly components using the three-dimensional models of the assembly components, e.g., as defined by respective CAD files. The training system can then evaluate a three-dimensional model of the updated assembly component generated during the simulation, e.g., as defined by a combined CAD file generated using the respective CAD files of the assembly components, to determine whether the updated assembly component was correctly assembled during the simulation.

The training system can then train the planner machine learning model using reinforcement learning from an outcome of the simulation. The training system can determine the reinforcement learning reward signal using one or more of: a measure of correctness of the updated assembly component, as described above; a measure of future feasibility of the final assembled product using the updated assembly component (i.e., can the future subtasks of the assembly task be correctly executed using the updated assembly component; or a time required to complete the subtask.

In some implementations, a training system can train different planner machine learning models corresponding to respective manufacturers. Different manufacturers can have different conventions for how assembly components are assembly together. Different manufacturers can also have different standard assembly components or different standard sequences of instructions. Therefore, for each of multiple manufacturers, the training system can train a respective planner machine learning model to identify the typical assembly process of the manufacturer, using training examples corresponding to the manufacturer.

In some implementations, the planner 190 can compose the robotic control plan from multiple different composable modules. For example, one or more modules can correspond to respective particular assembly components or classes of assembly components. Instead or in addition, one or more modules can correspond to respective actions or classes of actions, e.g., modules corresponding to insertion operations, rotation operations, etc. The planner 190 can maintain a library of these modules and access the relevant modules when generating a particular robotic control plan 192.

In some implementations, the planner 190 can obtain an initial robotic control plan that has been generated by an external system and updated the initial robotic control plan to generate the final robotic control plan 192. In some such implementations, the initial robotic control plan partially accomplishes the assembly task, but the final assembled product does not satisfy one or more requirements or the initial robotic control plan includes one or more errors that precludes the plan from being executed. In some other such implementations, the initial robotic control plan successfully accomplished the assembly task, but in a manner that is inefficient or in some way suboptimal. For example, the initial robotic control plan might be able to be successfully executed in a robotic operating environment that is different from the robotic operating environment 102, but unable to be successfully executed (or able to be executed but only in a suboptimal way) in the robotic operating environment 102. The planner 190 can then refine the initial robotic control plan, e.g., in a way described above, to generate the final robotic control plan 192 that is optimized for the robotic operating environment 102. For example, the initial robotic control plan can be provided by the manufacturer of the ready-to-assemble product, and/or can be manually programmed by engineers.

In some implementations, planner 190 can receive data that characterizes one or more humans performing the assembly task using the robotic components 160a-n. For example, the planner 190 can receive sensor data (e.g., image data, video data, LIDAR data, tactile perception data, force perception data, or motion perception data) captured during the human assembly of the assembly components to generate the final assembled product. The planner 190 can then process the data to generate a robotic control plan 192 that emulates the motions demonstrated by the humans using the robotic components 160a-n. This process is sometimes called "learning by demonstration."

As a particular example, the planner 190 can have access to a predetermined robotic control plan corresponding to a particular assembly product, e.g., a particular ready-to-assembly shelf. The manufacturer of the assembly product may release an updated model of the assembly product that is the same product except a particular assembly component has been replaced, e.g., a particular connector has been redesigned. In this example, the planner 190 can obtain the predetermined robotic control plan corresponding to the previous model of the assembly product, remove the module corresponding to the replaced assembly component, and insert a module corresponding to the new assembly component to generate the final robotic control plan 192. Thus, the planner 190 can leverage a composability framework in order to increase efficiency and avoid re-generating a new robotic control plan 192 from scratch for each assembly product.

In some implementations, in order to generate the robotic control plan 192, the planner 190 also obtains robotic component data 182 from the robotic component data store 180. The robotic component data 182 characterizes the abilities of the robotic components 160a-n. For example, the robotic component data 182 can include one or more of: design files for each robotic component 160a-n (e.g., CAD files), technical specifications for each robotic component 160a-n (e.g., payload capacity, reach, speed, accuracy thresholds, etc.), robot control simulation (RCS) data (e.g., modeled robot motion trajectories), or APIs for interaction with the robotic control system 150. The APIs can include one or more of sensor APIs (e.g., sensors that measure force, torque, motion, vision, gravity, etc.) or data management interfaces (e.g., product life-cycle (PLC), product life-cycle management (PLM), or manufacturing execution systems (MES) APIs). The robotic component data 182 can also include skill types for each robotic component 160a-n, which identifies actions that the robotic component can perform.

After generating the robotic control plan 192, the planner 190 can provide the robotic control plan 192 to the robotic control system 150. As described above, the robotic control system 150 can then execute the robotic control plan 192 by issuing commands 152 to the robotic components 160a-n in order to drive the movements of the robotic components 160a-n.

In some implementations, the planner 190 is an online planner. That is, the robotic control system 150 can receive the robotic control plan 192 and begin execution, and then provide feedback about the execution to the planner 190 during the execution. The planner 190 can then generate a new robotic control plan in response to the feedback. In some other implementations, the planner 190 is an offline planner. That is, the planner 190 can provide the robotic control plan 192 to the robotic control system 150 before the robotic control system 150 executes any operations, and the planner 190 does not receive any direct feedback from the robotic control system 150.

In some implementations, the robotic planning system 110 is in the robotic operating environment; that is, the robotic control plan 192 can be generated by an on-site planner 190. In some other implementations, the robotic planning system 110 is hosted within an offsite data center, which can be a distributed computing system having hundreds or thousands of computers in one or more locations. As a particular example, the robotic operating environment 102 can be a temporary robotic operating environment provided by the user, e.g., in the user's home.

FIGS. 2A-2D illustrate example user interfaces 210-290 for capturing instruction manual data. The user interfaces 210-290 can be displayed to a user of a user device, e.g., the user device 120 depicted in FIG. 1, in order to capture instruction manual data for generating a robotic control plan for executing an assembly task. The instruction manual data characterizes an instruction manual for the assembly task. As depicted in FIGS. 2A-2D, the assembly task is for assembling a ready-to-assembly piece of furniture.

The user interfaces illustrated in FIGS. 2A-2D are for exemplary purposes only. In some implementations, one or more illustrated user interfaces are not presented to the user. In some implementations, one or more additional user interfaces are presented to the user. In some implementations, the user can be presented with user interfaces that have the same or a similar function as the illustrated user interfaces, but with a different design. For example, the prompts can be worded differently, the colors can be different, the layout can be different, the interfaces can be presented to the user in a different order, etc.

Figure 2A:
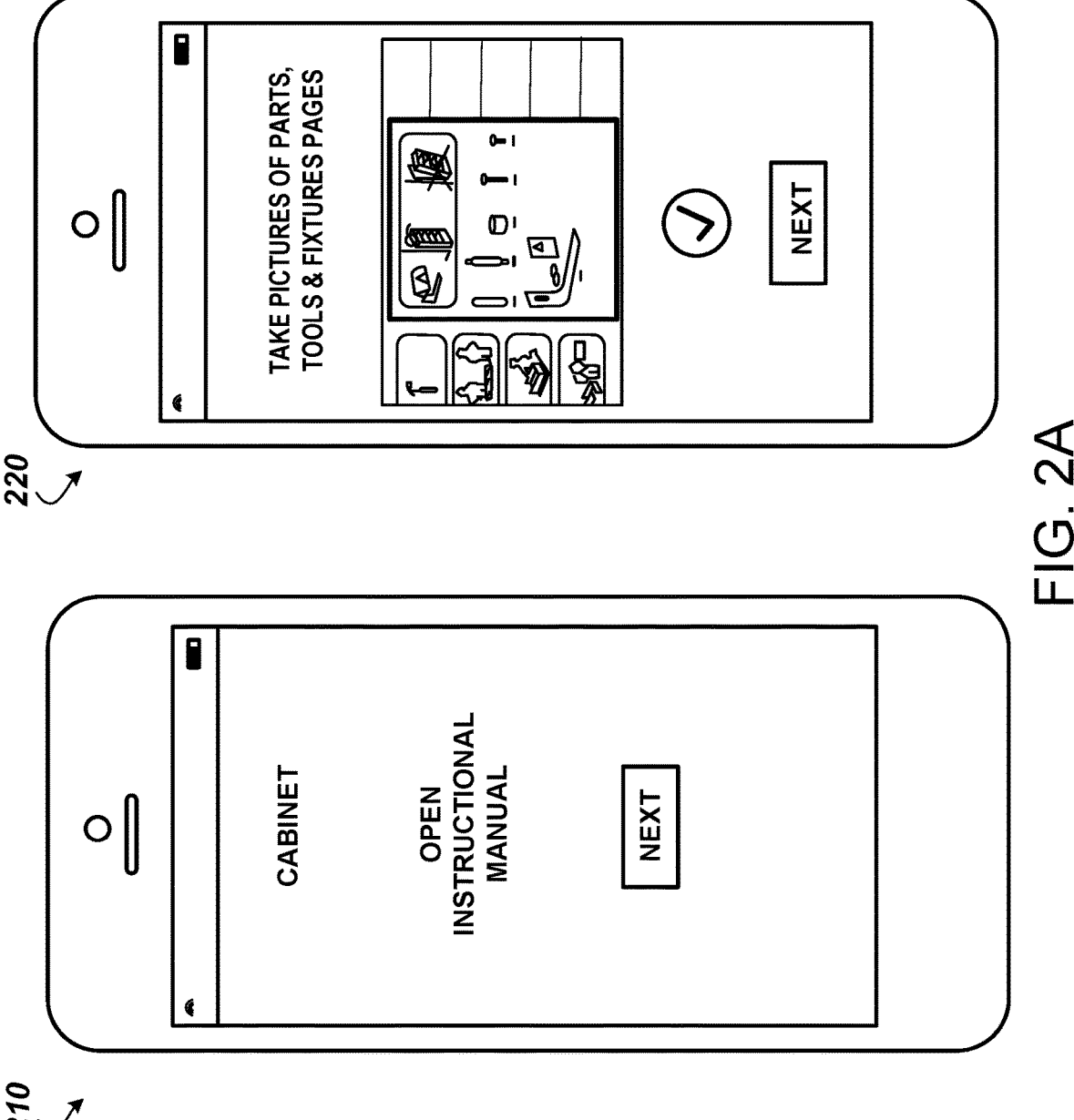
FIGS. 2A-2D illustrate example user interfaces for capturing instruction manual data.

Referring to FIG. 2A, in the first user interface 210, the user device prompts the user to obtain the instruction manual for the assembly task.

In the second user interface 220, the user device prompts the user to capture an image of a component identification page of the instruction manual, i.e., a page that lists assembly components required to complete the assembly task.

In the third user interface 230, the user device prompts the user to capture an image of a subtask page of the instruction manual, i.e., a page that describes how to complete a subtask of the assembly task.

Figure 2B:
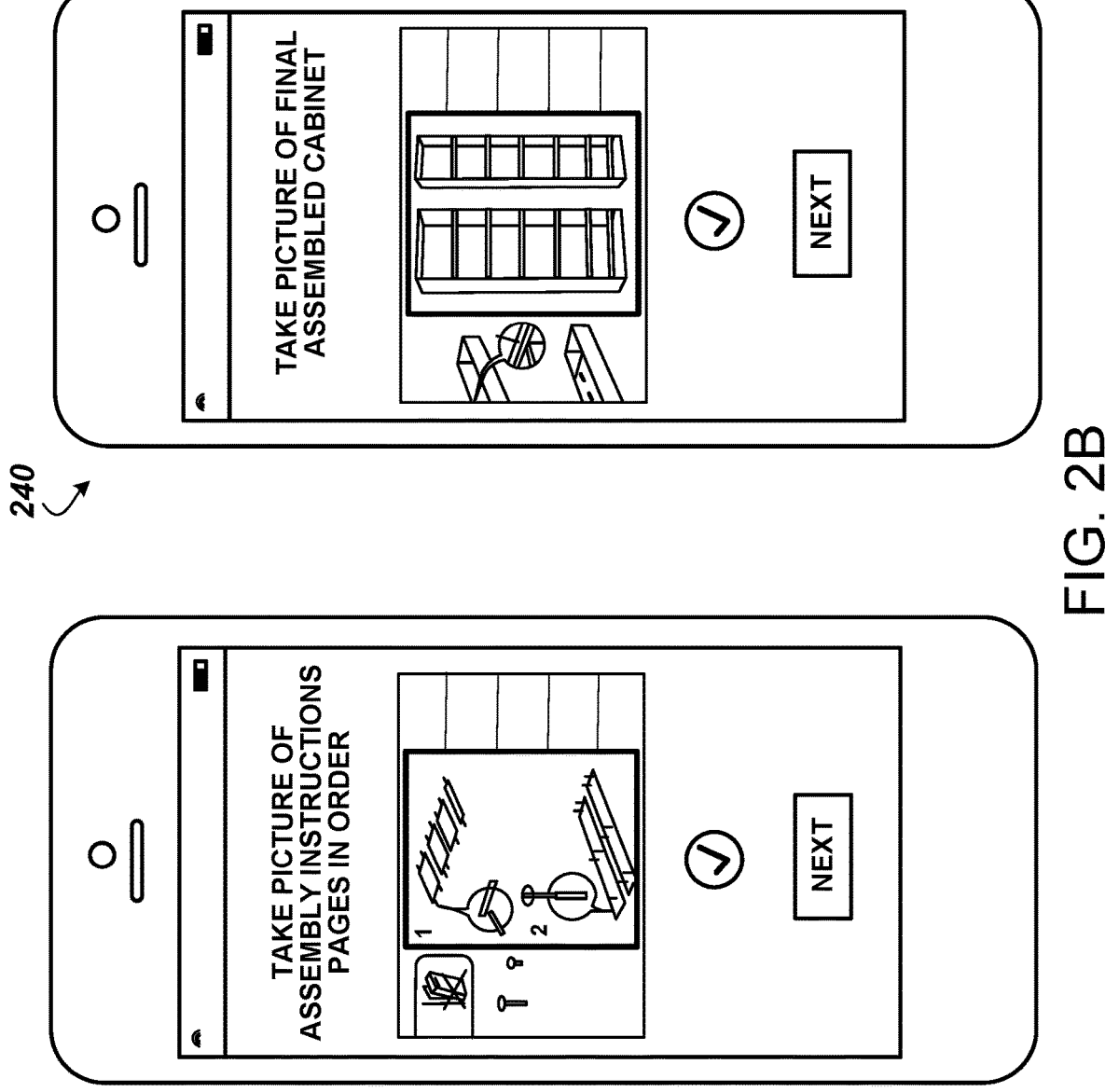

Referring to FIG. 2B, in the fourth user interface 240, the user device prompts the user to capture an image of a final subtask page of the instruction manual that illustrates the ready-to-assemble product after the assembly task has been completed.

The captured images of the respective pages of the instruction manual can be processed by an assembly instruction system, e.g., the assembly instruction system 170 depicted in FIG. 1, to generate instruction data for generating the robotic control plan.

Figure 2C:
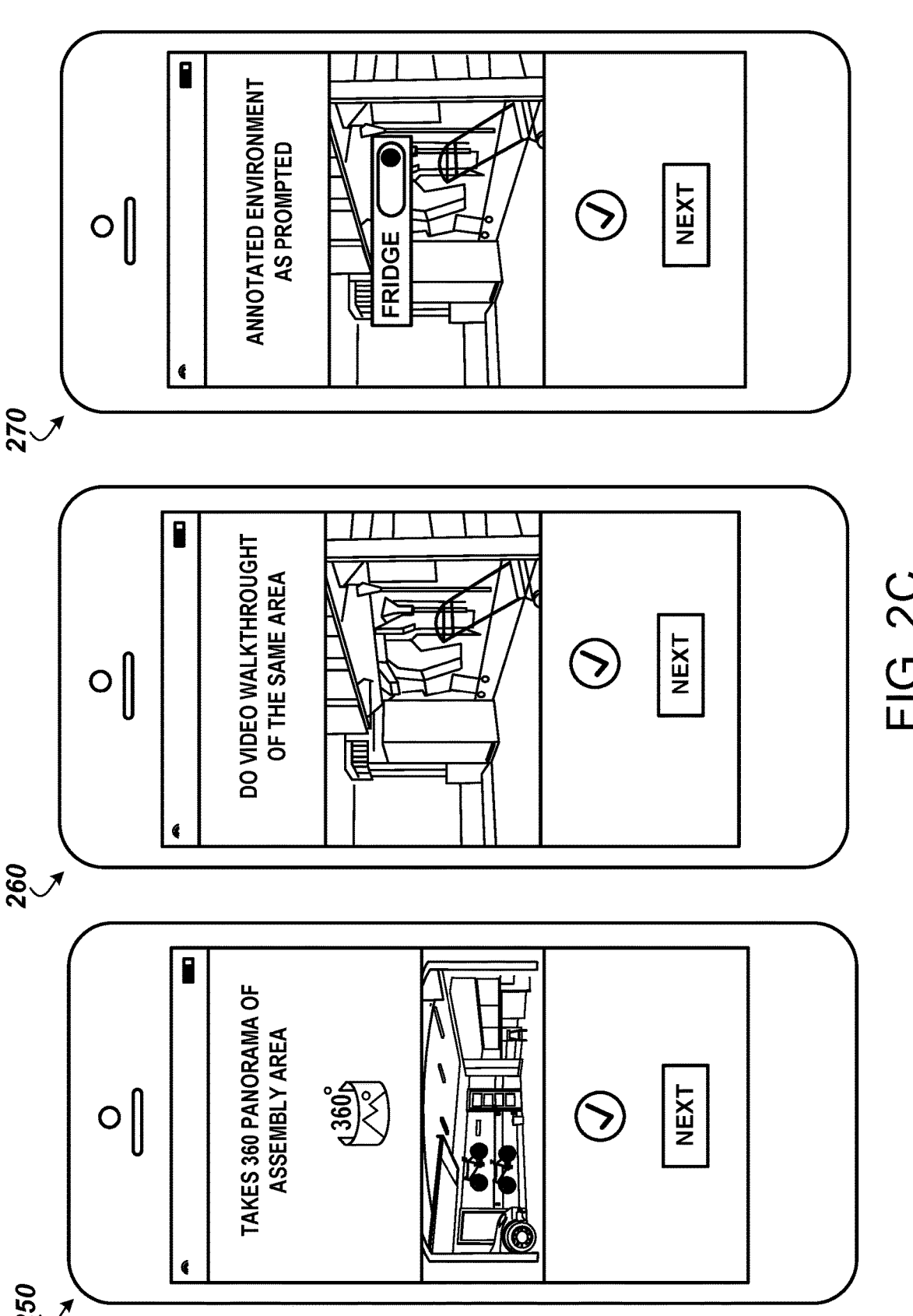

Referring to FIG. 2C, in the fifth user interface 250, the user device prompts the user to capture one or more images of the robotic operating environment in which the robotic control plan will be executed. The robotic operating environment can be a temporary robotic operating environment. As depicted in FIG. 2C, the robotic operating environment is a garage in the home of the user. A robotic planning system, e.g., the robotic planning system 110 depicted in FIG. 1, can use the images of the robotic operating environment to generate the robotic control plan.

In the sixth user interface 260, the user device prompts the user to capture one or more videos of the robotic operating environment. The robotic planning system can user the videos to generate the robotic control plan.

In the seventh user interface 270, the user device prompts the user to identify one or more items that are in the robotic operating environment, as depicted in the images captured in the fifth user interface 250 and/or the videos captured in the sixth user interface 260. For example, the robotic planning system can identify the items in the images and/or videos using one or more machine learning models. The robotic planning system can send data characterizing the identified items to the user device. The user device can prompt the user in the seventh user interface 270 to confirm a predicted classification of the items (e.g., as depicted in FIG. 2C, confirm that an item identified as a refrigerator is a refrigerator) or to assign a classification to the items. In some implementations, the user device can also prompt the user to identify whether the items can be removed from the robotic operating environment or not, e.g., to free more space for executing the robotic control plan. The robotic planning system can use this information to generate the robotic control plan.

Figure 2D:
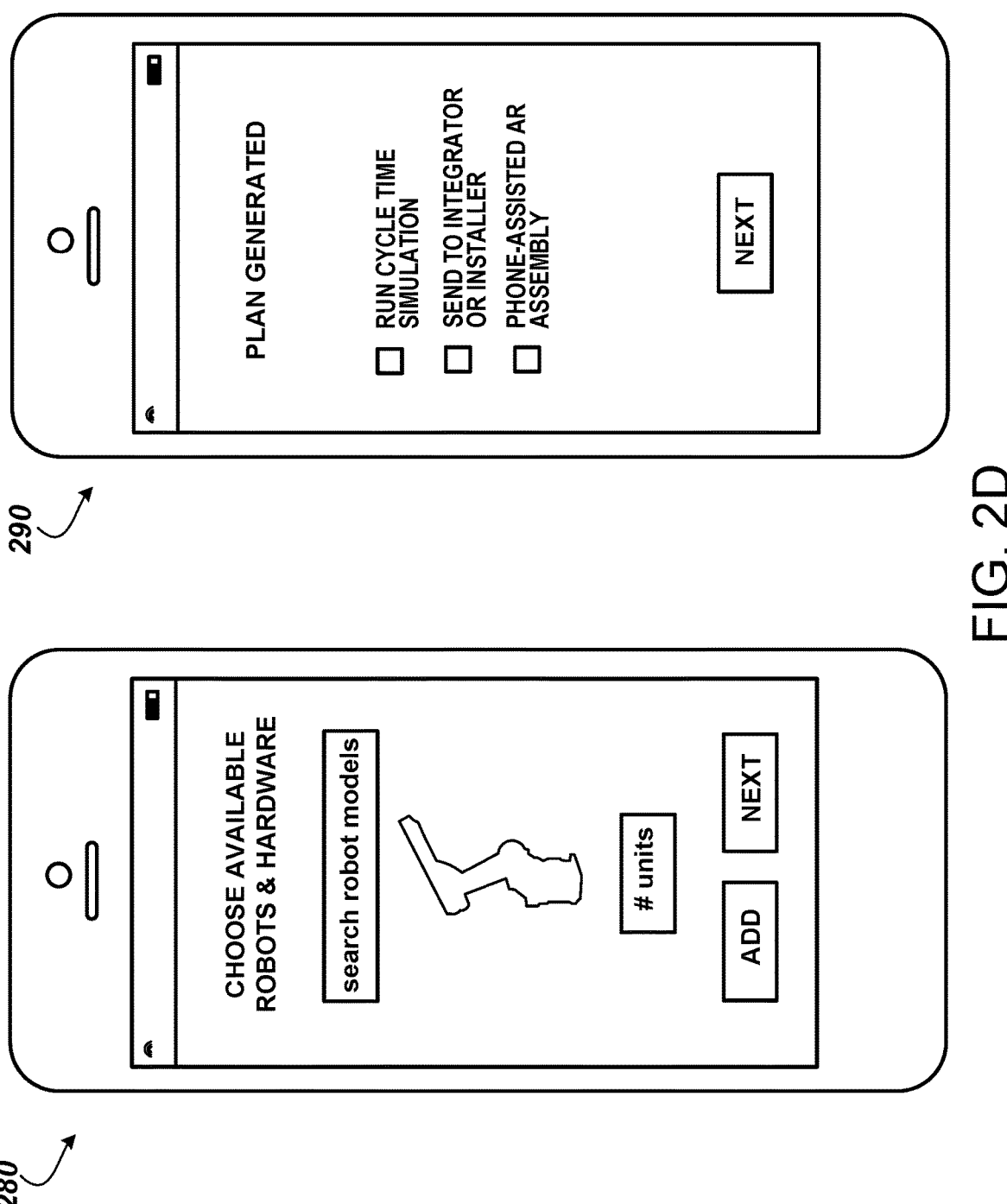

Referring to FIG. 2D, in the eighth user interface 280, the user device prompts the user to select one or more robotic components for executing the robotic control plan. For example, the robotic planning system can send data characterizing multiple different candidate robotic components that can be used to execute the robotic control plan, and the user device can provide a list of the candidate robotic components to the user. Instead or in addition, as depicted in FIG. 2D, the user can search an inventory of candidate robotic components. As a particular example, the user can select robotic components that have been delivered to the home of the user for completing the assembly task, e.g., delivered by the store from which the user purchased the ready-to-assembly product. The robotic planning system can generate the robotic control plan so that the robotic control plan can be executed using the selected robotic components. For example, the robotic planning system can identify the capabilities of the selected robotic components and determine, for each instruction of the instruction manual, whether the identified capabilities satisfy the requirements of the instruction.

In the ninth user interface 290, the user device notifies the user that the robotic control plan has been generated, and provides a list of options for the user. A first option allows the user to request that a simulation of the generated robotic control plan be executed, e.g., to determine an estimated time required to complete the assembly task using the robotic control plan.

A second option allows the user to request that the generated robotic control plan be sent to an integrator, e.g., a third-party integrator, so that the integrator can process the robotic control plan to estimate integration costs, service considerations, etc.

A third option allows the user to select a user device, e.g., a mobile phone or tablet, that will assist the user when setting up the robotic operating environment in the home of the user. For example, the use device can run an application that uses augmented reality to identify a location to place each assembly component and/or robotic component within the robotic operating environment. As a particular example, the user device can capture a live video from a camera of the user device and display the live video on a display of the user device, with a location in the environment that a particular component should be placed highlighted, outlined, or otherwise emphasized as depicted by the video.

Figure 3:
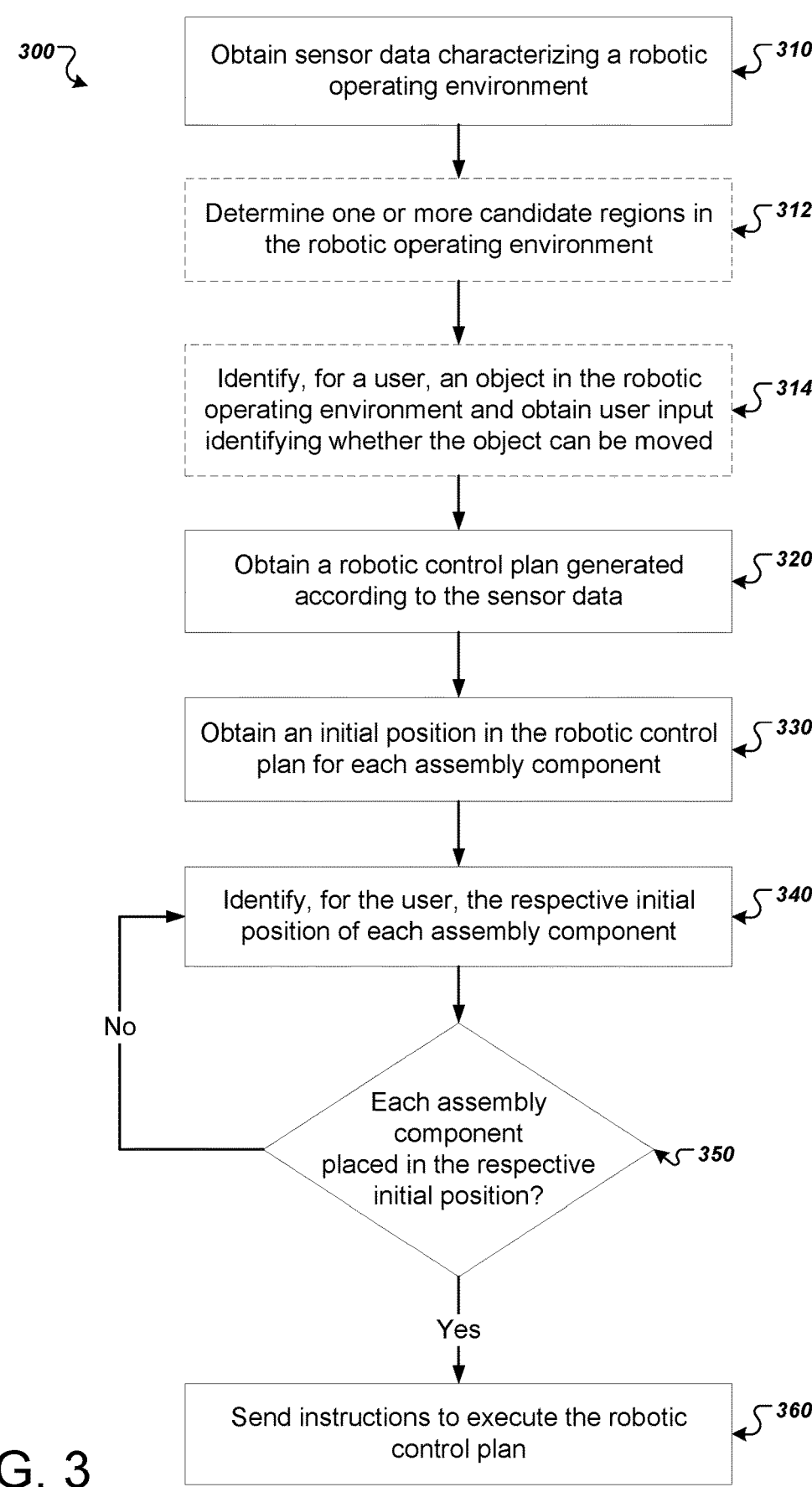
FIG. 3 is a flowchart of an example process for generating a robotic control plan.

FIG. 3 is a flowchart of an example process 300 for generating a robotic control plan. The process 300 can be implemented by one or more computer programs installed on one or more computers and programmed in accordance with this specification. For example, the process 300 can be performed by a robotic planning system, e.g., the robotic planning system 110 depicted in FIG. 1. For convenience, the process 300 will be described as being performed by a system of one or more computers.

The system obtains images depicting an instruction manual for assembling multiple assembly components (step 310). The system can obtain the images from an external system, e.g., from a user device.

The system processes the images depicting the instruction manual using a machine learning model to generate instruction data (step 320). The instruction data represents a sequence of instructions for assembling the assembly components. The machine learning model can be configured through training to process images depicting instruction manuals and to generate instruction data characterizing sequences of instructions identified in the instruction manuals.

In some implementations, the images can include an image depicting a portion of the instruction manual, e.g., one or more component identification pages of the instruction manual, that identifies each assembly component. The machine learning model can generate a representation for each assembly component using the portion of the instruction manual. The machine learning model can then use, for each assembly component, the generated representation of the assembly component to identify depictions of the assembly component in subsequent other portions of the instruction manual, e.g., on one or more subtask pages of the instruction manual.

In some implementations, the machine learning model can correspond to the manufacturer of the assembly components. That is, the machine learning model can be trained using training examples corresponding to the manufacturer, e.g., using training examples that include other instruction manuals that have been produced by the manufacturer.

In some implementations, the instruction data can be represented using a common computer language that can be used to represent instruction manuals produced by multiple different manufacturers, or any manufacturer.

Optionally, the system obtains images depicting the assembly components (step 330). The system can obtain the images from the external system, e.g., from the user device.

Optionally, the system processes the images depicting the assembly components to obtain assembly component data (step 340). The assembly component data can identify, for each assembly component, one or more properties of the assembly component. The properties can include one or more of: a material of the assembly component, a weight of the assembly component, a density of the assembly component, a center of mass of the assembly component, a strength of the assembly component, or a flexibility of the assembly component.

In some implementations, the system processes images depicting one or more of the assembly components to identify the one or more assembly components. The system can then obtain predetermined assembly component data for the one or more assembly components from a data store, e.g., the library 140 depicted in FIG. 1.

In some implementations, the system processes images depicting one or more assembly components using a second machine learning model to generate the assembly component data for the one or more assembly components. The second machine learning model can be configured through training to process images depicting assembly components and to generate assembly component data characterizing one or more properties of the assembly components.

The system processes the instruction data and, optionally, the assembly component data to generate a robotic control plan (step 350). The robotic control plan can identify one or more robotic components that can execute the robotic control plan for assembling the assembly components.

The system provides the robotic control plan to a robotic control system for executing the robotic control plan (step 360). The robotic control system can then execute the robotic control plan using the one or more robotic components. For example, the robotic components can execute the robotic control plan in a temporary robotic operating environment, e.g., in the home of the user.

The robot functionalities described in this specification can be implemented by a hardware-agnostic software stack, or, for brevity just a software stack, that is at least partially hardware-agnostic. In other words, the software stack can accept as input commands generated by the planning processes described above without requiring the commands to relate specifically to a particular model of robot or to a particular robotic component. For example, the software stack can be implemented at least partially by the robotic control system 150 of FIG. 1.

The software stack can include multiple levels of increasing hardware specificity in one direction and increasing software abstraction in the other direction. At the lowest level of the software stack are robot components that include devices that carry out low-level actions and sensors that report low-level statuses. For example, robotic components can include a variety of low-level components including motors, encoders, cameras, drivers, grippers, application-specific sensors, linear or rotary position sensors, and other peripheral devices. As one example, a motor can receive a command indicating an amount of torque that should be applied. In response to receiving the command, the motor can report a current position of a joint of the robot, e.g., using an encoder, to a higher level of the software stack.

Each next highest level in the software stack can implement an interface that supports multiple different underlying implementations. In general, each interface between levels provides status messages from the lower level to the upper level and provides commands from the upper level to the lower level.

Typically, the commands and status messages are generated cyclically during each control cycle, e.g., one status message and one command per control cycle. Lower levels of the software stack generally have tighter real-time requirements than higher levels of the software stack. At the lowest levels of the software stack, for example, the control cycle can have actual real-time requirements. In this specification, real-time means that a command received at one level of the software stack must be executed and optionally, that a status message be provided back to an upper level of the software stack, within a particular control cycle time. If this real-time requirement is not met, the robot can be configured to enter a fault state, e.g., by freezing all operation.

At a next-highest level, the software stack can include software abstractions of particular components, which will be referred to motor feedback controllers. A motor feedback controller can be a software abstraction of any appropriate lower-level components and not just a literal motor. A motor feedback controller thus receives state through an interface into a lower-level hardware component and sends commands back down through the interface to the lower-level hardware component based on upper-level commands received from higher levels in the stack. A motor feedback controller can have any appropriate control rules that determine how the upper-level commands should be interpreted and transformed into lower-level commands. For example, a motor feedback controller can use anything from simple logical rules to more advanced machine learning techniques to transform upper-level commands into lower-level commands. Similarly, a motor feedback controller can use any appropriate fault rules to determine when a fault state has been reached. For example, if the motor feedback controller receives an upper-level command but does not receive a lower-level status within a particular portion of the control cycle, the motor feedback controller can cause the robot to enter a fault state that ceases all operations.

At a next-highest level, the software stack can include actuator feedback controllers. An actuator feedback controller can include control logic for controlling multiple robot components through their respective motor feedback controllers. For example, some robot components, e.g., a joint arm, can actually be controlled by multiple motors. Thus, the actuator feedback controller can provide a software abstraction of the joint arm by using its control logic to send commands to the motor feedback controllers of the multiple motors.

At a next-highest level, the software stack can include joint feedback controllers. A joint feedback controller can represent a joint that maps to a logical degree of freedom in a robot. Thus, for example, while a wrist of a robot might be controlled by a complicated network of actuators, a joint feedback controller can abstract away that complexity and exposes that degree of freedom as a single joint. Thus, each joint feedback controller can control an arbitrarily complex network of actuator feedback controllers. As an example, a six degree-of-freedom robot can be controlled by six different joint feedback controllers that each control a separate network of actual feedback controllers.

Each level of the software stack can also perform enforcement of level-specific constraints. For example, if a particular torque value received by an actuator feedback controller is outside of an acceptable range, the actuator feedback controller can either modify it to be within range or enter a fault state.

To drive the input to the joint feedback controllers, the software stack can use a command vector that includes command parameters for each component in the lower levels, e.g., a positive, torque, and velocity, for each motor in the system. To expose status from the joint feedback controllers, the software stack can use a status vector that includes status information for each component in the lower levels, e.g., a position, velocity, and torque for each motor in the system. In some implementations, the command vectors also include some limit information regarding constraints to be enforced by the controllers in the lower levels.

At a next-highest level, the software stack can include joint collection controllers. A joint collection controller can handle issuing of command and status vectors that are exposed as a set of part abstractions. Each part can include a kinematic model, e.g., for performing inverse kinematic calculations, limit information, as well as a joint status vector and a joint command vector. For example, a single joint collection controller can be used to apply different sets of policies to different subsystems in the lower levels. The joint collection controller can effectively decouple the relationship between how the motors are physically represented and how control policies are associated with those parts. Thus, for example if a robot arm has a movable base, a joint collection controller can be used to enforce a set of limit policies on how the arm moves and to enforce a different set of limit policies on how the movable base can move.

At a next-highest level, the software stack can include joint selection controllers. A joint selection controller can be responsible for dynamically selecting between commands being issued from different sources. In other words, a joint selection controller can receive multiple commands during a control cycle and select one of the multiple commands to be executed during the control cycle. The ability to dynamically select from multiple commands during a real-time control cycle allows greatly increased flexibility in control over conventional robot control systems.

At a next-highest level, the software stack can include joint position controllers. A joint position controller can receive goal parameters and dynamically compute commands required to achieve the goal parameters. For example, a joint position controller can receive a position goal and can compute a set point for achieve the goal.

At a next-highest level, the software stack can include Cartesian position controllers and Cartesian selection controllers. A Cartesian position controller can receive as input goals in Cartesian space and use inverse kinematics solvers to compute an output in joint position space. The Cartesian selection controller can then enforce limit policies on the results computed by the Cartesian position controllers before passing the computed results in joint position space to a joint position controller in the next lowest level of the stack. For example, a Cartesian position controller can be given three separate goal states in Cartesian coordinates x, y, and z. For some degrees, the goal state could be a position, while for other degrees, the goal state could be a desired velocity.

These functionalities afforded by the software stack thus provide wide flexibility for control directives to be easily expressed as goal states in a way that meshes naturally with the higher-level planning techniques described above. In other words, when the planning process uses a process definition graph to generate concrete actions to be taken, the actions need not be specified in low-level commands for individual robotic components. Rather, they can be expressed as high-level goals that are accepted by the software stack that get translated through the various levels until finally becoming low-level commands. Moreover, the actions generated through the planning process can be specified in Cartesian space in way that makes them understandable for human operators, which makes debugging and analyzing the schedules easier, faster, and more intuitive. In addition, the actions generated through the planning process need not be tightly coupled to any particular robot model or low-level command format. Instead, the same actions generated during the planning process can actually be executed by different robot models so long as they support the same degrees of freedom and the appropriate control levels have been implemented in the software stack.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:

obtaining, from a user device, image data depicting an instruction manual for assembling a plurality of assembly components;

processing the image data using a machine learning model to generate instruction data representing a sequence of instructions for assembling the plurality of assembly components, wherein the machine learning model has been configured through training to process images depicting instruction manuals and to generate instruction data characterizing sequences of instructions identified in the instruction manuals;

processing the instruction data to generate a robotic control plan to be executed by one or more robotic components for assembling the plurality of assembly components; and providing the robotic control plan to a robotic control system for executing the robotic control plan using the one or more robotic components.

Embodiment 2 is the method of embodiment 1, wherein generating the robotic control plan comprises:

obtaining, from the user device, second image data depicting the plurality of assembly components;

obtaining, for one or more of the assembly components, assembly component data characterizing one or more properties of the assembly component; and processing i) the instruction data and ii) the assembly component data to generate the robotic control plan.

Embodiment 3 is the method of embodiment 2, wherein obtaining assembly component data for a particular assembly component comprises:

processing the second image data depicting the particular assembly component using a second machine learning model to generate the assembly component data for the particular assembly component, wherein the second machine learning model has been configured through training to process images depicting assembly components and to generate assembly component data characterizing one or more properties of the assembly components.

Embodiment 4 is the method of any one of embodiments 2 or 3, wherein obtaining assembly component data for a particular assembly component comprises:

identifying the particular assembly component in the second image data; and obtaining, from a data store, predetermined assembly component data for the particular assembly component.

Embodiment 5 is the method of any one of embodiments 2-4, wherein the assembly component data comprises data identifying, for one or more of the plurality of assembly components, one or more of:

a material of the assembly component, a weight of the assembly component, a density of the assembly component, a center of mass of the assembly component, a strength of the assembly component, a flexibility of the assembly component, or one or more preferred or required touch points of the assembly component.

Embodiment 6 is the method of any one of embodiments 1-5, wherein the plurality of assembly components have been manufactured by a particular manufacturer, and wherein the machine learning model has been trained using training examples corresponding to the particular manufacturer.

Embodiment 7 is the method of embodiment 6, wherein the instruction data is represented using a computer language that can be used to represent instruction manuals produced by a plurality of different manufacturers.

Embodiment 8 is the method of any one of embodiments 1-7, wherein the one or more robotic components execute the robotic control plan in a temporary robotic operating environment.

Embodiment 9 is the method of any one of embodiments 1-8, wherein:

the image data comprises an image depicting a portion of the instruction manual that identifies each of the plurality of assembly components; and generating the instruction data comprises, for each assembly component, generating a representation of the assembly component and identifying, using the generated representation, respective depictions of the assembly component in one or more other images of the image data corresponding to respective other portions of the instruction manual.

Embodiment 10 is a system comprising: one or more computers and one or more storage devices storing instructions that are operable, when executed by the one or more computers, to cause the one or more computers to perform the method of any one of embodiments 1 to 9.

Embodiment 11 is one or more non-transitory computer storage media encoded with a computer program, the program comprising instructions that are operable, when executed by data processing apparatus, to cause the data processing apparatus to perform the method of any one of embodiments 1 to 9.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising:

obtaining, from a user device, image data comprising a plurality of images of an instruction manual, wherein the instruction manual depicts assembly actions for assembling a plurality of assembly components into a product;

generating, for each image using a machine learning model, instruction data for the image, the instruction data representing a sequence of instructions for a robot to perform one or more assembly actions to assemble a respective plurality of assembly components represented in the image, wherein the machine learning model has been configured, through training on training examples that each include one or more illustrations of one or more assembly actions using a respective plurality of assembly components and ground-truth instruction data representing a sequence of instructions for a robot to perform the one or more assembly actions using the plurality of assembly components;

processing the instruction data to generate a sequence of stages, each stage having a plurality of subtasks to be executed by one or more robots for assembling the plurality of assembly components identified from the depictions of assembly actions for assembling the assembly components into the product in the one or more images of the image data; and causing a robotic control system to execute the plurality of subtasks using the one or more robots.

2. The method of claim 1, wherein processing the instruction data to generate a sequence of stages comprises:

obtaining, from the user device, second image data depicting the plurality of assembly components;

obtaining, for one or more of the assembly components, assembly component data characterizing one or more properties of the assembly component; and processing i) the instruction data and ii) the assembly component data to generate the sequence of stages.

3. The method of claim 2, wherein obtaining assembly component data for a particular assembly component comprises:

processing the second image data depicting the particular assembly component using a second machine learning model to generate the assembly component data for the particular assembly component, wherein the second machine learning model has been configured through training to process images depicting assembly components and to generate assembly component data characterizing one or more properties of the assembly components.

4. The method of claim 2, wherein obtaining assembly component data for a particular assembly component comprises:

identifying the particular assembly component in the second image data; and obtaining, from a data store, predetermined assembly component data for the particular assembly component.

5. The method of claim 2, wherein the assembly component data comprises data identifying, for one or more of the plurality of assembly components, one or more of:

a material of the assembly component, a weight of the assembly component, a density of the assembly component, a center of mass of the assembly component, a strength of the assembly component, a flexibility of the assembly component, or one or more preferred or required touch points of the assembly component.

6. The method of claim 2, wherein processing i) the instruction data and ii) the assembly component data to generate the sequence of stages comprises:

identifying an order of assembly actions to be executed by the one or more robots from the instruction data;

identifying, for each assembly action, a skill type from the instruction data that represents a type of movement to be executed by the one or more robots on one or more assembly components of the plurality of assembly components;

identifying, for each assembly action, one or more standards from the instruction data that represent a measure of success for the assembly action; and generating the sequence of stages from the order of assembly actions, and skill type and one or more standards for each assembly action.

7. The method of claim 1, wherein the plurality of assembly components have been manufactured by a particular manufacturer, and wherein the machine learning model has been trained using training examples corresponding to the particular manufacturer.

8. The method of claim 7, wherein the instruction data is represented using a computer language that can be used to represent instruction manuals produced by a plurality of different manufacturers.

9. The method of claim 1, wherein the one or more robots execute the plurality of subtasks in a temporary robotic operating environment.

10. The method of claim 1, wherein:

the image data comprises an image depicting a portion of the instruction manual that identifies each of the plurality of assembly components; and the one or more images of the image data comprise one or more other images that correspond to respective other portions of the instruction manual.

11. The method of claim 1, wherein the instruction manual comprises one or more physical pages.

12. The method of claim 1, wherein the ground-truth instruction data of each training example represents instruction data for accomplishing one or more subtasks.

13. The method of claim 1, wherein each training example further comprises data identifying assembly components depicted in the respective instruction manual.

14. A system comprising one or more computers and one or more storage devices storing instructions that are operable, when executed by the one or more computers, to cause the one or more computers to perform operations comprising:

obtaining, from a user device, image data comprising a plurality of images of an instruction manual, wherein the instruction manual depicts assembly actions for assembling a plurality of assembly components into a product;

generating, for each image using a machine learning model, instruction data for the image, the instruction data representing a sequence of instructions for a robot to perform one or more assembly actions to assemble a respective plurality of assembly components represented in the image, wherein the machine learning model has been configured, through training on training examples that each include one or more illustrations of one or more assembly actions using a respective plurality of assembly components and ground-truth instruction data representing a sequence of instructions for a robot to perform the one or more assembly actions using the plurality of assembly components;

processing the instruction data to generate a sequence of stages, each stage having a plurality of subtasks to be executed by one or more robots for assembling the plurality of assembly components identified from the depictions of assembly actions for assembling the assembly components into the product in the one or more images of the image data; and causing a robotic control system to execute the plurality of subtasks using the one or more robots.

15. The system of claim 14, wherein processing the instruction data to generate a sequence of stages comprises:

obtaining, from the user device, second image data depicting the plurality of assembly components;

obtaining, for one or more of the assembly components, assembly component data characterizing one or more properties of the assembly component; and processing i) the instruction data and ii) the assembly component data to generate the sequence of stages.

16. The system of claim 15, wherein obtaining assembly component data for a particular assembly component comprises:

processing the second image data depicting the particular assembly component using a second machine learning model to generate the assembly component data for the particular assembly component, wherein the second machine learning model has been configured through training to process images depicting assembly components and to generate assembly component data characterizing one or more properties of the assembly components.

17. The system of claim 15, wherein obtaining assembly component data for a particular assembly component comprises:

identifying the particular assembly component in the second image data; and obtaining, from a data store, predetermined assembly component data for the particular assembly component.

18. The system of claim 14, wherein the plurality of assembly components have been manufactured by a particular manufacturer, and wherein the machine learning model has been trained using training examples corresponding to the particular manufacturer.

19. The system of claim 14, wherein:

the image data comprises an image depicting a portion of the instruction manual that identifies each of the plurality of assembly components; and the one or more images of the image data comprise one or more other images that correspond to respective other portions of the instruction manual.

20. One or more non-transitory storage media storing instructions that when executed by one or more computers cause the one or more computers to perform operations comprising:

obtaining, from a user device, image data comprising a plurality of images of an instruction manual, wherein the instruction manual depicts assembly actions for assembling a plurality of assembly components into a product;

generating, for each image using a machine learning model, instruction data for the image, the instruction data representing a sequence of instructions for a robot to perform one or more assembly actions to assemble a respective plurality of assembly components represented in the image, wherein the machine learning model has been configured, through training on training examples that each include one or more illustrations of one or more assembly actions using a respective plurality of assembly components and ground-truth instruction data representing a sequence of instructions for a robot to perform the one or more assembly actions using the plurality of assembly components;

processing the instruction data to generate a sequence of stages, each stage having a plurality of subtasks to be executed by one or more robots for assembling the plurality of assembly components identified from the depictions of assembly actions for assembling the assembly components into the product in the one or more images of the image data; and causing a robotic control system to execute the plurality of subtasks using the one or more robots.

21. The non-transitory storage media of claim 20, wherein processing the instruction data to generate a sequence of stages comprises:

obtaining, from the user device, second image data depicting the plurality of assembly components;

obtaining, for one or more of the assembly components, assembly component data characterizing one or more properties of the assembly component; and processing i) the instruction data and ii) the assembly component data to generate the sequence of stages.

22. The non-transitory storage media of claim 21, wherein obtaining assembly component data for a particular assembly component comprises:

processing the second image data depicting the particular assembly component using a second machine learning model to generate the assembly component data for the particular assembly component, wherein the second machine learning model has been configured through training to process images depicting assembly components and to generate assembly component data characterizing one or more properties of the assembly components.

23. The non-transitory storage media of claim 21, wherein obtaining assembly component data for a particular assembly component comprises:

identifying the particular assembly component in the second image data; and obtaining, from a data store, predetermined assembly component data for the particular assembly component.

24. The non-transitory storage media of claim 20, wherein:

the image data comprises an image depicting a portion of the instruction manual that identifies each of the plurality of assembly components; and the one or more images of the image data comprise one or more other images that correspond to respective other portions of the instruction manual.

* * * * *